3,029,229
SUSPENSION POLYMERIZATION OF VINYL CHLORIDE IN THE PRESENCE OF HIGHER ALIPHATIC UNSATURATED ALCOHOLS
Walter Doell, Burgkirchen, Upper Bavaria, Germany, assignor to Farbwerke Hoechst Aktiengesellschaft vormals Meister Lucius & Brüning, Frankfurt am Main, Germany, a corporation of Germany
No Drawing. Filed Oct. 17, 1958, Ser. No. 767,772
Claims priority, application Germany Oct. 23, 1957
10 Claims. (Cl. 260—87.1)

This invention relates to a process for preparing polymers and copolymers from vinyl compounds in the aqueous phase.

The polymerization of vinyl compounds, especially vinyl chloride and vinyl acetate, with the use of dispersing agents, such as polyvinyl alcohol, gelatin, methyl cellulose or barium sulfate, is well known in the art. The reaction proceeds always in the same manner regardless of the activator used in the individual case, the phase ratio and the organic or inorganic nature of the dispersing agent employed.

The reaction time depends primarily on the reaction temperature used and on the concentration of the activator. The conversion is not uniform during the entire reaction and rather increases steadily from the onset of the reaction. The culminating point of the reaction is reached as soon as about 60–70% of the monomer used has been polymerized. The heat evolved at this moment impedes considerably the control of the course of the reaction with respect to heat engineering. While prior to this moment the heat evolved may be eliminated without difficulty, the elimination of heat is not warranted with certainty when the reaction has reached its culminating point. A strong increase in temperature of the reaction mixture sets in which gives rise to the formation of reaction products having modified properties. In addition thereto, an undesired high proportion of monomer is polymerized in the batch which as experience has shown impairs the quality of the final product.

In order to keep the rate of polymerization within definite and previously determined limits, stoppers are added to the polymerization batch, for example styrene or butadiene, which generally are capable of arresting the reaction, but on the other hand they involve the disadvantage of impairing the quality of the final product or of impeding the work up of the reaction mixture.

In addition to the aforesaid difficulties which are involved in conducting the reaction, the final product obtained exhibits further short-comings which often become apparent only when operating on an industrial scale. These short-comings consist in that the individual batches are often very dissimilar as to their thermal stability or processing properties, that the particle-size distribution varies within too wide limits and that the individual particles of the final product have varying gelatinizing properties. As a consequence thereof, nonhomogenized polymer particles become visible as so-called "fish eyes" in transparent films or tubes made from these polymers.

Now, we have found that the aforesaid disadvantages can be completely or substantially avoided by adding to the polymerization mixture in addition to the usual dispersing agents a small amount of a monohydric or polyhydric aliphatic alcohol having one or more double bonds and containing 10–25, preferably 12–20 carbon atoms.

Alcohols of the type referred to above are soluble in vinyl monomers and may therefore be added to the polymerization batch in an aqueous solution or in the form of a solution in the vinyl monomer concerned. The alcohols may be admixed with the batch prior to or during the polymerization.

From among the aforesaid group of monohydric or polyhydric aliphatic alcohols there may be used all individual representatives and, more especialy, those unsaturated alcohols containing one, two, three or more double bonds which are obtained from vegetable or animal oils and fats by selective hydrogenation. Industrial mixtures of these alcohols consist substantially of oleic alcohol and other alcohols, such as undecenol, octadecenol or linalol. These alcohols may be used individually or, more advantageously, in the form of commercial industrial mixtures.

The alcohols specified above need only be added in minor amounts to produce a favorable effect, for example in a proportion of 0.01% to 0.2%, calculated on the vinyl monomer contained in the batch. They may however also be used in an amount greater than indicated above, for example in a proportion of 0.3% to 2% or more. To produce a polymer having a K-value (cf. H. Fikentscher, Cellulosechemie 13 (1932) 60) of about 50, it is advantageous to add the alcohol in a proportion of, for example, 1.0%.

The addition of the aforesaid alcohols has a very favorable effect on the course of the reaction in the reaction vessel. The reaction proceeds extremely smoothly and the culminating point of the reaction which is otherwise liable to occur with strong evolution of heat so difficult to eliminate is practically suppressed. The time of reaction, it is true, is somewhat longer depending on the amount of alcohol used, but this can be compensated, if necessary, by slightly increasing the activator concentration.

The process of this invention enables vinyl chloride to be polymerized in suspension on an industrial scale even at a raised temperature of, for example, 65–70° C., without strong heat accumulation occurring which may be so critical in the temperature range indicated above. The polymers produced by the process of this invention have a K-value of 55 and less.

Moreover, the final products made as described above are more uniform. The individual batches are much more uniform in their behaviour with respect to one another and so is the particle-size distribution. In addition thereto, the number of not-homogenized polymer particles is strongly reduced so that transparent films and tubes made from the polymers are practically free from "fish eyes."

The process of this invention can be used for making homopolymers of vinyl chloride or vinyl acetate or for the manufacture of other vinyl esters or copolymers for example of vinyl chloride or vinyl acetate. Even in the latter case, the course of the reaction can be controlled without difficulty.

As activators, there may be used in the process of this invention all known substances forming free radicals, especially the organic peroxides which are soluble in the monomer, for example lauroyl peroxide or benzoyl peroxide.

The following examples serve to illustrate the invention, but they are not intended to limit it thereto:

*Example 1*

An autoclave provided with a stirrer was charged with 2500 parts of water and 2 parts of methyl cellulose. 2 parts of oleic alcohol (sperm oil alcohol obtained by selective hydrogenation from natural sperm oil) and 3 parts of dilauroyl peroxide were added and subsequently 1400 parts of vinyl chloride. The polymerization was carried out at 55° C.; the reaction took about 13 hours and could be very well controlled. The final product was very uniform, fine-grained and had a K-value of 70. From the product so obtained a transparent soft film, for example 0.2 mm. thick, was prepared on the roller within 8 minutes at 150° C. in the presence of 30% calculated on the mixture of dioctyl phthalate. The film obtained was compared with a polyvinyl chloride film which had been prepared in the same manner but without the addition of alcohol. The latter film showed about 20-50 and more fish eyes per 100 sq. cm. while the former had only 0-2 fish eyes per 100 sq. cm.

*Example 2*

An autoclave provided with a stirrer was charged with 3000 parts of water and 2 parts of methyl cellulose. 4.5 parts of oleic alcohol as used in Example 1 and 3 parts of dilauroyl peroxide were added and subsequently 1300 parts of vinyl chloride. The batch was polymerized at 70° C. within about 7 hours; the temperature could be kept constant without difficulty. The final product obtained was a fine-grained polymer which had a K-value of 57. As to "fish eyes" the product exhibited the same properties as that described in Example 1.

The same batch but without the addition of oleic alcohol could not be polymerized at a constant temperature and gave rise to an increase in temperature of up to 20° C. depending on the batch volume, so that quality variation could not be avoided.

*Example 3*

An autoclave provided with a stirrer was charged with a solution of 10 parts of polyvinyl alcohol in 2800 parts of water, 2.3 parts of oleic alcohol and 1.6 parts of dilauroyl peroxide were added and subsequently 290 parts of vinyl acetate and 1500 parts of vinyl chloride. The batch was polymerized at 67° C. while stirring. The reaction temperature could be well controlled. The final product obtained had a K-value of 55.

The fish eye test carried out as described in Example 1 revealed 0 to 2 fish eyes per 100 sq. cm. for a film produced on the roller at a temperature of 135° C. A film produced from a product which had been polymerized without the addition of oleic alcohol had 50 to 100 fish eyes per 100 sq. cm.

I claim:

1. A process for the manufacture of polyvinyl chloride in an aqueous medium which comprises polymerizing 1300-1400 parts of vinyl chloride in the presence of 2500-3000 parts of water, 2 parts of methyl cellulose, 3 parts of dilauroyl peroxyde and 2-4.5 parts of oleic alcohol all parts being by weight at 55-70° C.

2. A process for the manufacture of a copolymer of vinyl chloride and vinyl acetate which comprises polymerizing 1500 parts vinyl chloride and 290 parts vinyl acetate in the presence of 2800 parts water, 10 parts polyvinyl alcohol, 1.6 parts dilauroyl peroxyde and 2.3 parts oleic alcohol, all parts being by weight at 67° C.

3. In the process for producing a fine-grained solid polymer by polymerizing a monomeric starting material selected from the group consisting of vinyl chloride and a mixture of a major portion of vinyl chloride and the balance of vinyl acetate in the presence of an initiator supplying free radicals and being soluble in said monomeric starting material, said polymerization being carried out in an aqueous suspension containing a suspending agent selected from the group consisting of polyvinyl alcohol, gelatine, methyl cellulose and barium sulphate, the improvement which comprises adding to the aqueous monomeric suspension 0.01 to 2% calculated on the weight of the monomer of at least one alcohol selected from the group consisting of monohydric unsaturated aliphatic alcohols and polyhydric unsaturated aliphatic alcohols, said alcohol containing 10 to 25 carbon atoms and one to three olefinic double linkages, said addition preventing the formation of fish-eyes when the polymer is processed with the application of heat.

4. The process of claim 3 wherein the aliphatic alcohol contains 12-20 carbon atoms.

5. The process of claim 3 wherein the amount of the aliphatic alcohol added is from 0.01 to 0.3% calculated on the weight of the monomer.

6. The process of claim 3 wherein the aliphatic alcohol is obtained by selective hydrogenation of sperm oil.

7. The process of claim 3 wherein the monomeric starting material is substantially vinyl chloride.

8. The process of claim 6 wherein the monomeric starting material is substantially vinyl chloride.

9. The process of claim 3 wherein the suspending agent is methyl cellulose.

10. The process of claim 3 wherein the aliphatic alcohol is added to the reaction mixture during the polymerization.

References Cited in the file of this patent
UNITED STATES PATENTS 2,581,844    Eggleston _____ Jan. 8, 1952
2,614,087    Turnbull _____ Oct. 14, 1952

OTHER REFERENCES

Schildknecht: Vinyl Compounds, pp. 332, 394 (1952), John Wiley and Sons, Inc., New York.